United States Patent
Shibayama

(10) Patent No.: US 10,044,893 B2
(45) Date of Patent: Aug. 7, 2018

(54) IMAGE FORMING APPARATUS

(71) Applicant: Sharp Kabushiki Kaisha, Sakai, Osaka (JP)

(72) Inventor: Yuki Shibayama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/298,365

(22) Filed: Oct. 20, 2016

(65) Prior Publication Data
US 2017/0118365 A1 Apr. 27, 2017

(30) Foreign Application Priority Data

Oct. 27, 2015 (JP) .................................. 2015-210440

(51) Int. Cl.
*H04N 1/00* (2006.01)

(52) U.S. Cl.
CPC ..... *H04N 1/00925* (2013.01); *H04N 1/00411* (2013.01); *H04N 1/00424* (2013.01); *H04N 1/00474* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2010/0333035 A1* | 12/2010 | Yoshida | G03G 15/50 715/835 |
| 2013/0283275 A1* | 10/2013 | Kim | G06F 9/445 718/100 |
| 2014/0063547 A1* | 3/2014 | Sakurai | G06F 3/1211 358/1.15 |
| 2014/0118784 A1* | 5/2014 | Ichiyama | H04N 1/00307 358/1.15 |
| 2014/0368875 A1 | 12/2014 | Sato | |
| 2016/0185147 A1* | 6/2016 | Iguchi | B41J 29/36 347/110 |
| 2016/0261766 A1* | 9/2016 | Tsunekawa | H04N 1/233 |
| 2017/0034377 A1* | 2/2017 | Hayashi | H04N 1/00811 |

FOREIGN PATENT DOCUMENTS

JP 2015-001813 A 1/2015

* cited by examiner

*Primary Examiner* — Fan Zhang
(74) *Attorney, Agent, or Firm* — Keating & Bennett, LLP

(57) ABSTRACT

An image forming apparatus has a plurality of functions and permits setting an operating condition for each of the functions. The image forming apparatus includes: an operating portion used for operation of selecting each of the functions and setting the operating condition; an image processor that performs an image processing in a manner that depends on a function selected and an operating condition set at the operating portion; and a controller that controls the operating portion and the image processor. If one of the functions is selected at the operating portion and a setting is determined on a predetermined operating condition that is settable within the selected function, the controller prohibits the selected function from being changed to another function.

8 Claims, 13 Drawing Sheets

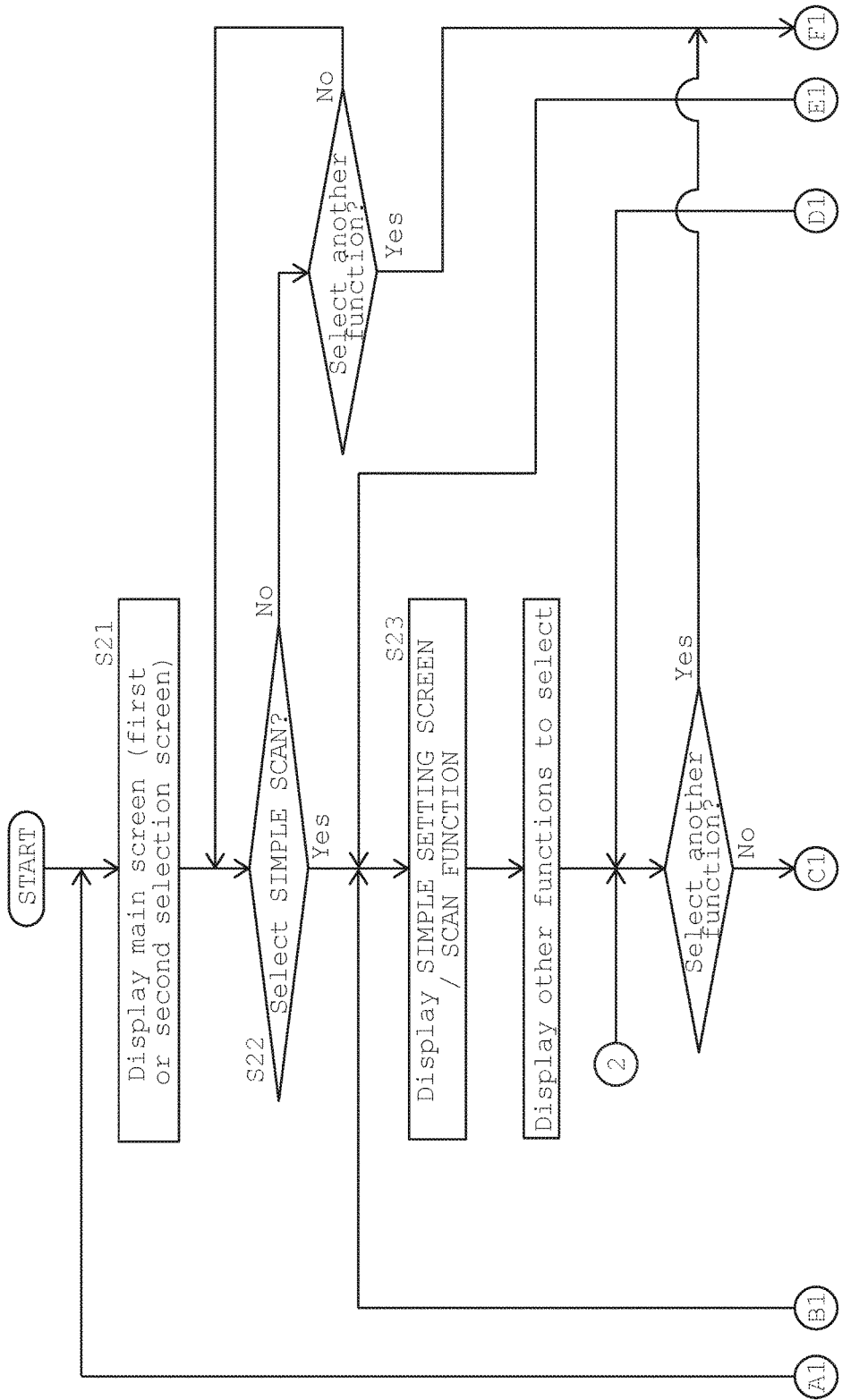

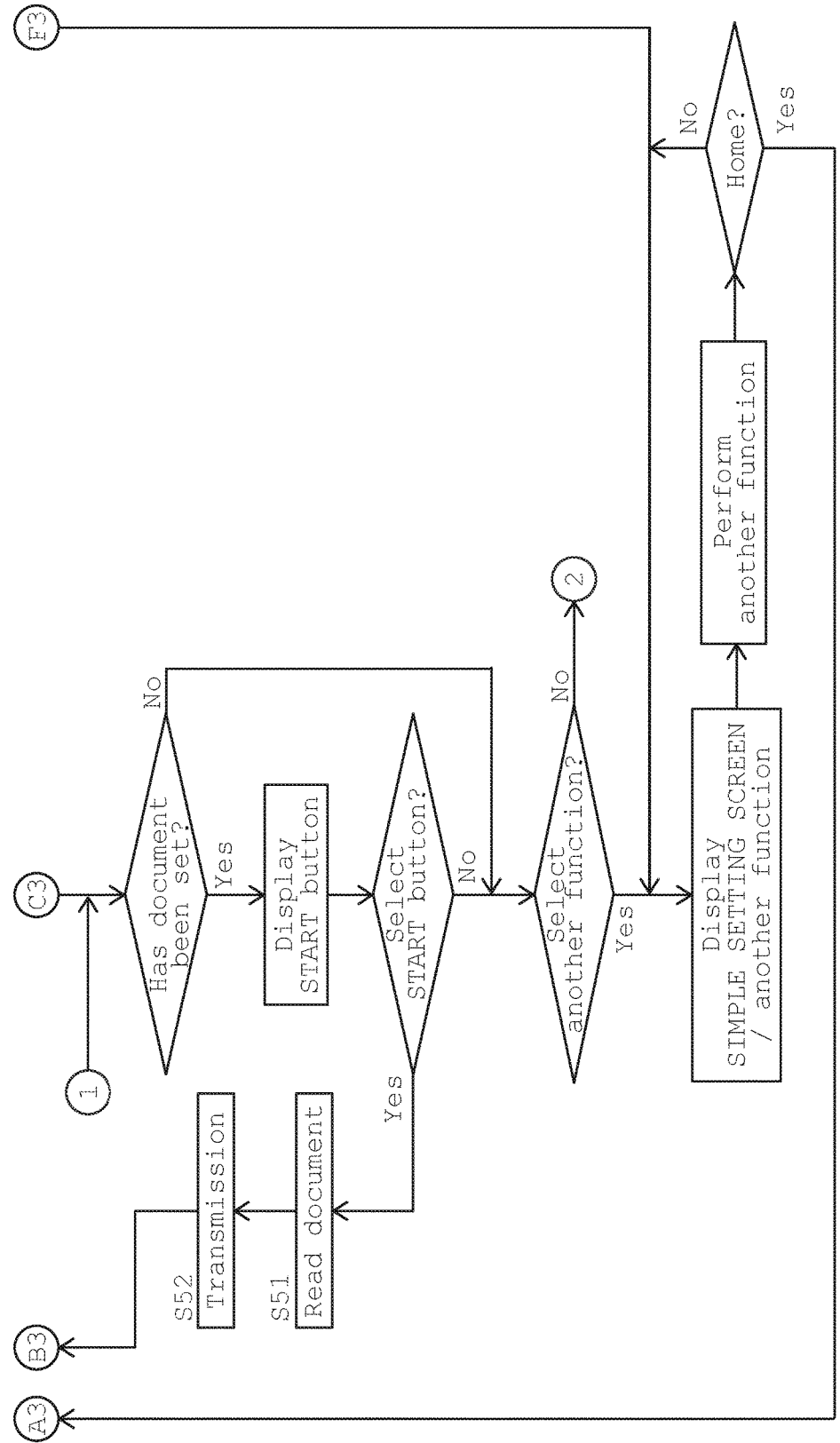

IMAGE FORMING APPARATUS

CROSS REFERENCE

This Nonprovisional application claims priority under 35 U.S.C. § 119(a) on Patent Application No. 2015-210440 filed in Japan on Oct. 27, 2015, the entire contents of which are hereby incorporated by reference.

BACKGROUND OF THE INVENTION

1. Field of the Invention

The present invention relates to an image forming apparatus, more specifically, to a technique to be employed while a function is selected or an operating condition is set.

2. Description of Related Art

An image forming apparatus such as multifunction machine has a variety of functions including a copying function, a facsimile transmitting function, a scanning function, a printing function, and an image transmitting function (for example, see Japanese Patent Application Unexamined Publication No. 2015-1813 Bulletin). The image forming apparatus permits setting an operating condition about each function. For example, the image forming apparatus permits setting a plurality of operating conditions such as a copying density, a copying magnification, a copy count, and a sheet size about the copying function. Also, in the facsimile transmitting function and the scanning function, a transmission address (destination) or the like can be specified.

Such an operating condition is set on a setting screen that is displayed on a touch display panel or the like. Specifically, an icon or a setting domain prepared for each settable operating condition is displayed on the setting screen. If any icon is selected on the setting screen, a detailed setting screen for an operating condition corresponding to the selected icon is displayed, and the operating condition is set on the detailed setting screen. Also, a copy count is inputted in a setting domain for numeral input, and a destination is selected in another setting domain providing list view of addresses selectable from within.

However, with the conventional image forming apparatus, even when an operating condition is set, it is possible to select a function other than the function that is selected. In the case where the other function is selected while the operating condition is set, all the settings until then are reset. For this reason, in the case where another function is selected due to user's misoperation while the operating condition is set, the user needs to set the operating condition again, to the user's annoyance.

Additionally, with the conventional image forming apparatus, even after the copy count or the destination is set, further setting operation is possible in the same setting domain. For this reason, there is a risk that settings may be changed or added due to user's misoperation. For example, there is a risk that although the user has set the copy count to a predetermined number, an additional numeral input may be made due to the user's misoperation, and accordingly copying may be carried out with an unintended copy count. Also, there is a risk that although the user has set the destination to a predetermined address, a change or addition of the address may be made due to the user's misoperation, and accordingly a transmission to an unintended destination may be carried out.

SUMMARY OF THE INVENTION

An image forming apparatus according to the present invention has a plurality of functions and permits setting an operating condition for each of the functions. The image forming apparatus includes: an operating portion used for operation of selecting each of the functions and setting the operating condition; an image processor that performs an image processing in a manner that depends on a function selected and an operating conditions set at the operating portion; and a controller that controls the operating portion and the image processor. If one of the functions is selected at the operating portion and a setting is determined on a predetermined operating condition that is settable within the selected function, the controller prohibits the selected function from being changed to another function.

BRIEF DESCRIPTION OF THE DRAWINGS

FIGS. 10A to 10D are flow charts showing a process performed by the controller in a third embodiment.

DETAILED DESCRIPTION OF THE EMBODIMENTS

[1] First Embodiment

[1-1] Configuration of the Image Forming Apparatus

Figure 1:
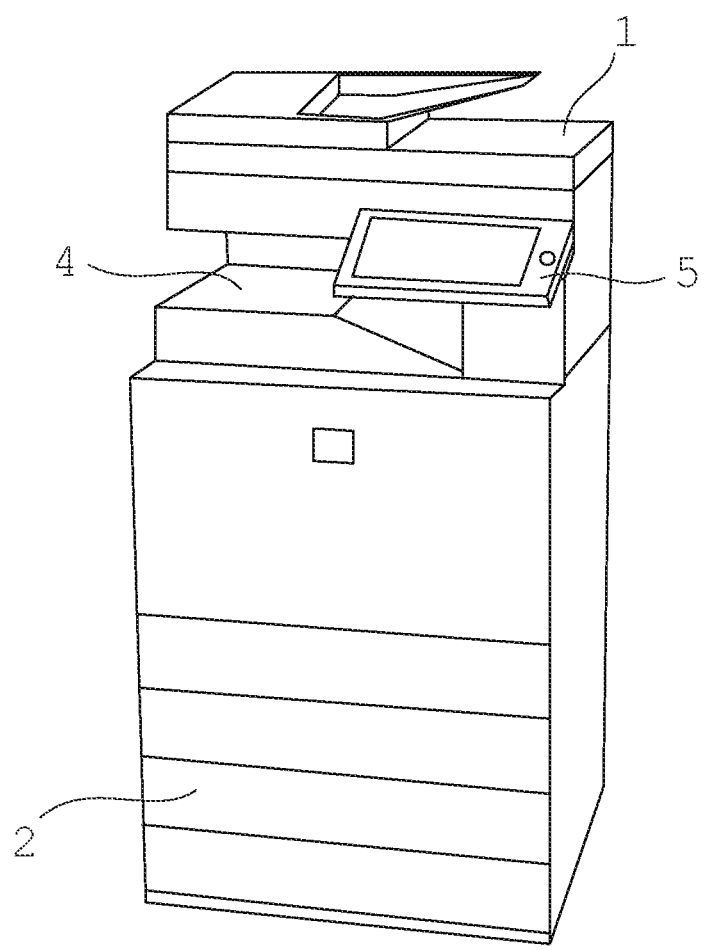
FIG. 1 is a perspective view schematically showing an image forming apparatus according to an embodiment of the present invention.
Figure 2:
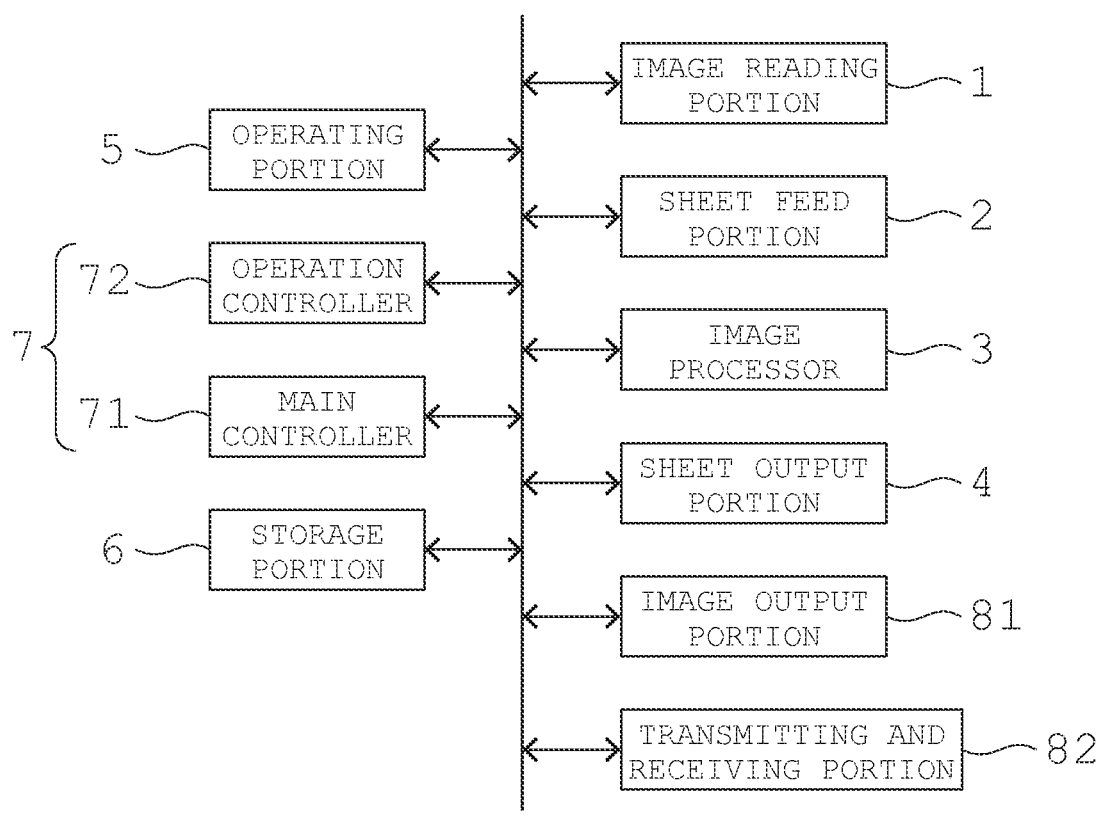
FIG. 2 is a block diagram of the image forming apparatus.

As shown in FIGS. 1 and 2, an image forming apparatus includes an image reading portion 1, a sheet feed portion 2, an image processor 3, a sheet output portion 4, an operating portion 5, a storage portion 6, a controller 7, an image output portion 81, and a transmitting and receiving portion 82. The image forming apparatus of this embodiment is a multifunction machine having various functions (copying function, facsimile transmitting function, scanning function, printing function, image transmitting function, etc.). The image forming apparatus permits setting a plurality of operating conditions for each of the functions. These operating conditions include various types of conditions such as a copying density, a copying magnification, a copy count, and a sheet size that are settable about the copying function, and a destination that is settable about the facsimile transmitting function, for example.

The image reading portion 1 generates image data by optically reading an image of a document loaded on a document platen. The image reading portion 1 may have an automatic document feeding mechanism.

The image data generated by the image reading portion 1 is input to the image processor 3. Image data input to the image processor 3 is not limited to the image data generated by the image reading portion 1 but may include image data acquired by the transmitting and receiving portion 82 from an external connected device through a network, etc.

The image processor 3 performs various types of image processing such as a correction process and a filtering process on image data in a manner that depends on a selected function and a setting of an operating condition. The image data after being subjected to the image processing is input to the image output portion 81 if the copying function or the printing function is selected, and is input to the transmitting and receiving portion 82 if the facsimile transmitting function or the scanning function is selected.

The image output portion 81 performs an image forming process of an electrophotographic system based on image data input to the image output portion 81 and prints an image on a sheet fed from the sheet feed portion 2. The sheet including the printed image is output to the sheet output portion 4. A sheet is not limited to a sheet made from paper such as plain paper or photographic paper but includes a sheet made from a resin material such as an OHP film and sheets made from various other materials.

The transmitting and receiving portion 82 transmits and receives image data through a network. More specifically, the transmitting and receiving portion 82 has a function of receiving the image data from an external connected device such as a personal computer and a function of transmitting the image data to the external connected device. As an example of the transmission, the transmitting and receiving portion 82 transmits the image data having been input from the image processor 3 to the external connected device through a network, for example.

Figure 4:
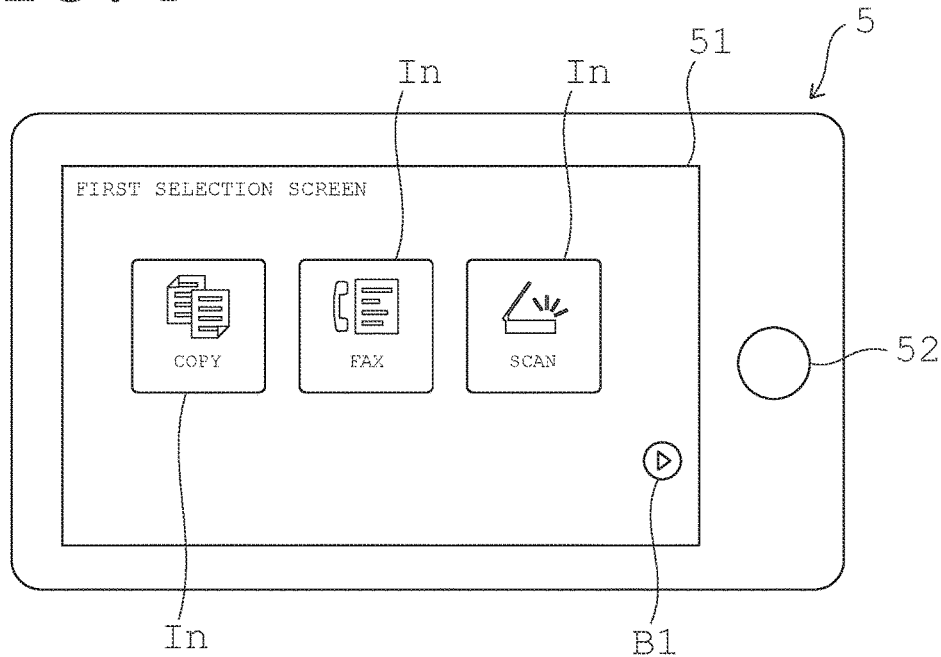
FIG. 4 is a schematic diagram showing a first selection screen that is displayed on a touch display panel.

As shown in FIG. 4, the operating portion 5 includes a touch display panel 51 and a capacitive button 52, and functions as a user interface. Specifically, the operating portion 5 has a function as an input portion to receive an operational command from a user, and a function as a display portion to provide the user with information such as a setting screen and an operating condition. Examples of a screen to be displayed on the touch display panel 51 include a selection screen used for operation of selecting a function to be fulfilled by the image forming apparatus and a setting screen used for operation of setting an operating condition. The capacitive button 52 is, for example, a button used for changing a currently displayed screen to a home screen on the touch display panel 51. The operating portion 5 may be formed only of either the touch display panel 51 or the capacitive button 52. The capacitive button 52 may include a plurality of capacitive buttons 52.

The storage portion 6 stores data such as a set value of a control parameter to be used for control on each portion of the image forming apparatus. The storage portion 6 further stores data such as image data for a setting screen to be displayed on the touch display panel 51. The controller 7 controls each portion of the image forming apparatus in a manner that depends on a function selected at the operating portion 5 and a setting of an operating condition set at the operating portion 5. More specifically, the controller 7 reads data such as a set value of a control parameter from the storage portion 6 that can satisfy a setting of an operating condition set at the operating portion 5, and controls each portion of the image forming apparatus based on the read data such as the set value. The controller 7 includes a main controller 71 responsible for overall control on the image forming apparatus, and an operation controller 72 mainly responsible for control on the operating portion 5.

Various types of control processors such as a central processing unit (CPU) and a microcomputer are applicable as each of the main controller 71 and the operation controller 72. A process to be performed by each of the main controller 71 and the operation controller 72 may be realized by making the image processing apparatus or the operating portion 5 execute a series of corresponding programs. Such programs may be stored in a storage medium (such as a flash memory, for example) in a state of being readable by the storage medium, or may be stored in the storage portion 6.

[1-2] Control of the Image Forming Apparatus

Figure 3:
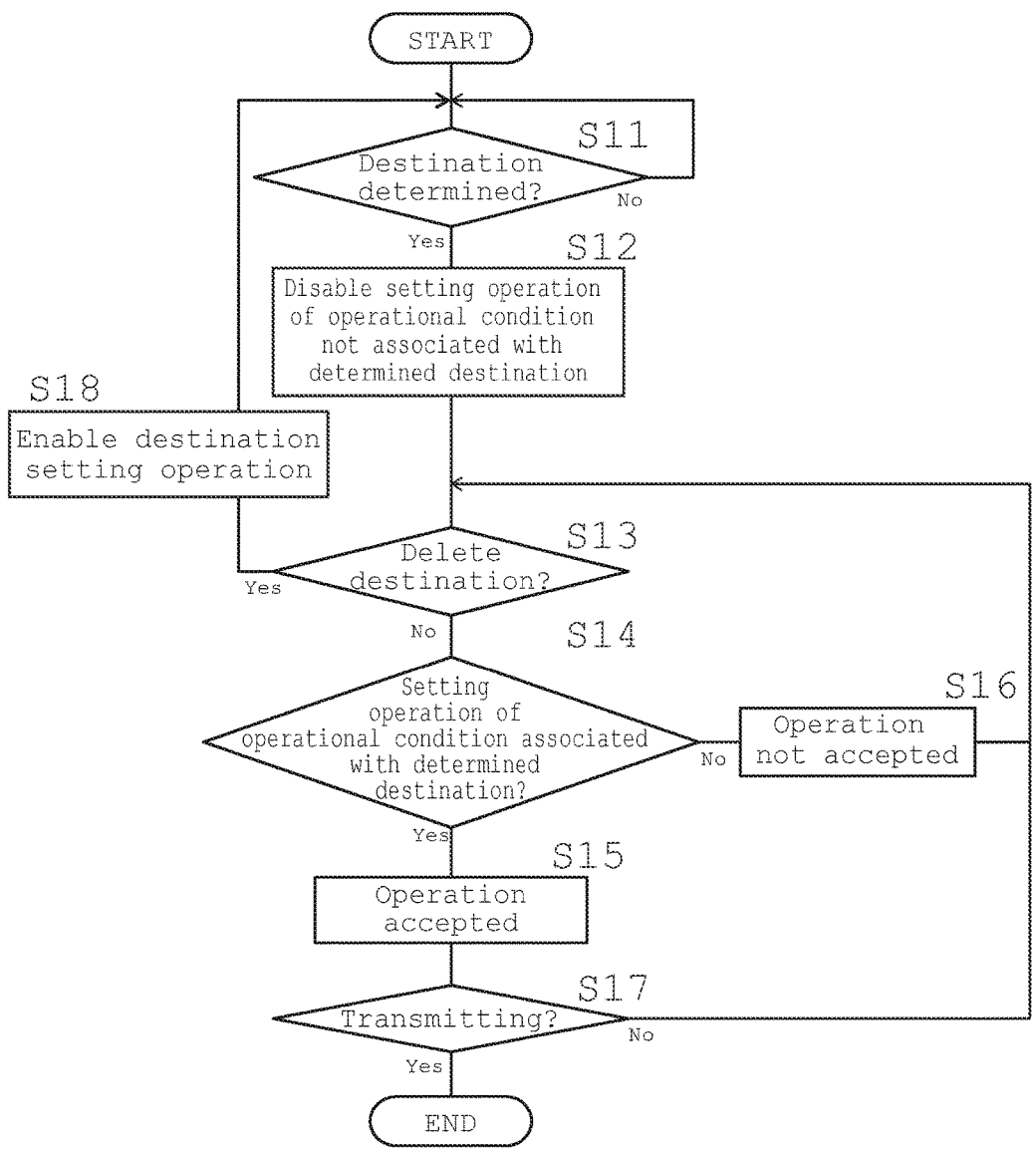
FIG. 3 is a flow chart showing a process performed by a controller in a first embodiment.

The following describes how the controller 7 executes control in the image forming apparatus. FIG. 3 is a flow chart showing a process performed by the controller 7 including the operation controller 72. The following detailed description is mainly intended for control executed by the operation controller 72 and relating to selection of a function to be fulfilled by the image forming apparatus and setting of an operating condition.

As shown in FIG. 4, the operation controller 72 makes the touch display panel 51 display a first selection screen. The first selection screen is a screen to be used if a user hopes to perform normal setting operation. The first selection screen includes an icon In prepared for each function of the image forming apparatus and with which a normal setting screen about this function is to be displayed. On the first selection screen shown in FIG. 4, the icon In corresponds to each of the copying function, the facsimile transmitting function (in FIG. 5, "facsimile transmission" is abbreviated as "FAX"), and the scanning function. The first selection screen may display icons In corresponding to various functions not limited to these functions.

Figure 5:
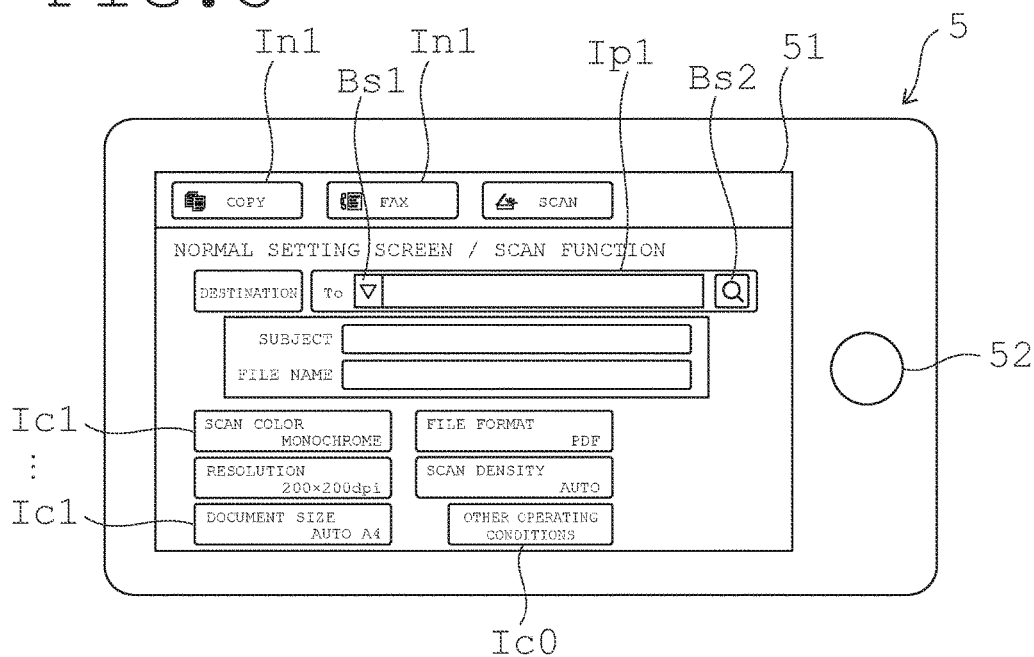
FIG. 5 is a schematic diagram showing a normal setting screen for a scanning function.

If any of the icons In is selected on the first selection screen, the operation controller 72 makes the touch display panel 51 display a normal setting screen about a function corresponding to the selected icon In, as shown in FIG. 5.

The normal setting screen mentioned herein is a screen that allows many operating conditions about a target function to be set. The displayed normal setting screen includes an icon Ic1 prepared for each settable operating condition and with which a detailed setting screen about this operating condition is to be displayed, and a setting domain Ip1 with which the operating condition is to be set by means of an entry, for example. Additionally, in this embodiment, icons In1 that permit selecting functions other than the selected function, are displayed further on the normal setting screen.

FIG. 5 shows a screen that is displayed as the normal setting screen if the icon In corresponding to the scanning function is selected on the first selection screen (see FIG. 4). On this normal setting screen, the setting domain Ip1 is an image that permits specifying a destination (address) of image data obtained by scanning. The icons Ic1 are ones corresponding to respective operating conditions other than the destination, and the displayed icons Ic1 correspond to a scan color, a resolution, a document size, a file format, and a scan density respectively. Icons Ic1 respectively corresponding to operating conditions other than those above-mentioned are integrated into one icon Ico written as "OTHER OPERATING CONDITIONS". Further, displayed as icons In1 are ones that permit selecting the copying function and the facsimile transmitting function, respectively.

Figure 6A:
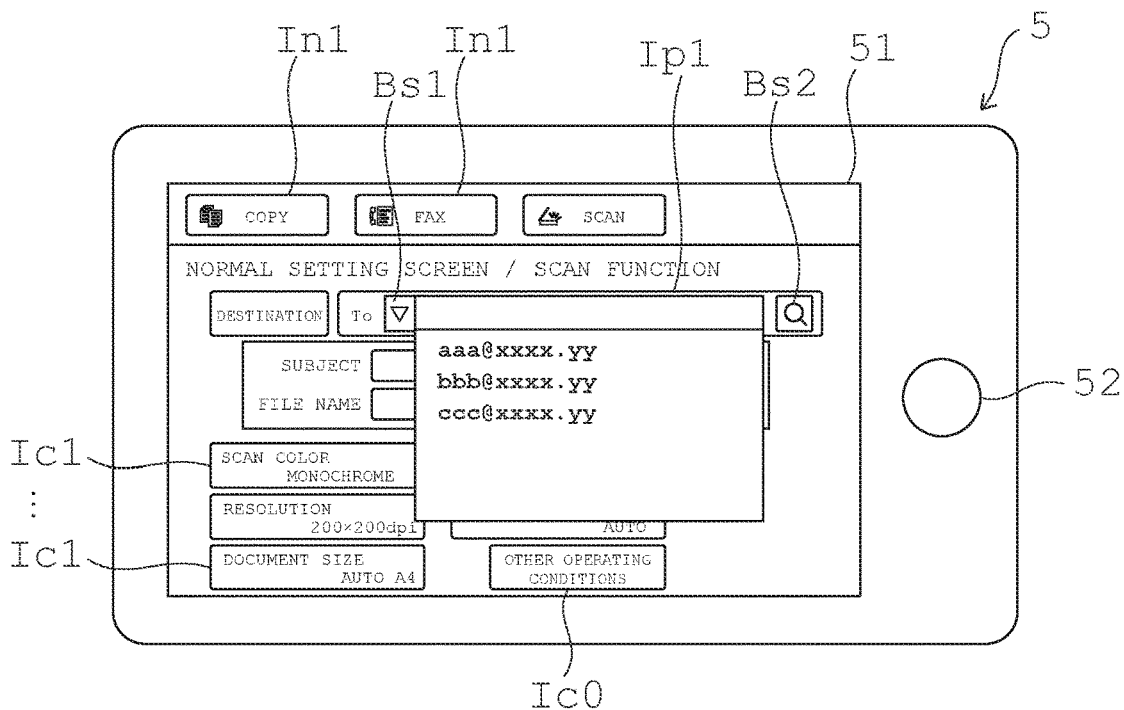
FIGS. 6A and 6B are schematic diagrams of the normal setting screen that are shown correspondingly to the process performed by an operation controller in the first embodiment, with FIG. 6A showing a state where a setting operation on a destination which is an operating condition is enabled, and FIG. 6B showing a state where additional setting operation on the destination is disabled.

The setting domain Ip1 includes a button Bs1 that causes addresses that becomes destinations to be displayed in selectable list view, and a button Bs2 that causes a search screen that is used in destination search to be displayed. The addresses that are displayed by pushing down the button Bs1 are, for example, those that are registered beforehand by the user. And the search screen that is displayed by pushing down the button Bs2 is, for example, used if the main body of the image forming apparatus (specifically, the storage portion 6), or a device such as USB storage or the like is selected as destination of the image data. FIG. 6 shows a state where the button Bs1 is pushed on the normal setting screen.

If any one of the addresses displayed in list view by pushing down the button Bs1 is selected, the operation controller 72 causes the selected address to be displayed in a destination entry field that is provided in the setting domain Ip1, and determines the selected address as the destination (determines to be "Yes" at step S11 in FIG. 3). Also, if a destination is selected and determined on the search screen displayed by pushing down the button Bs2, the operation controller 72 causes the selected and determined destination to be displayed in the entry field. The user may directly input the address to the destination entry field through the operation of the touch display panel 51. In this case, after the input, if a determination button (not shown), for example, included in the setting domain Ip1 is pushed, the operation controller 72 determines the inputted address as the destination.

Figure 6B:
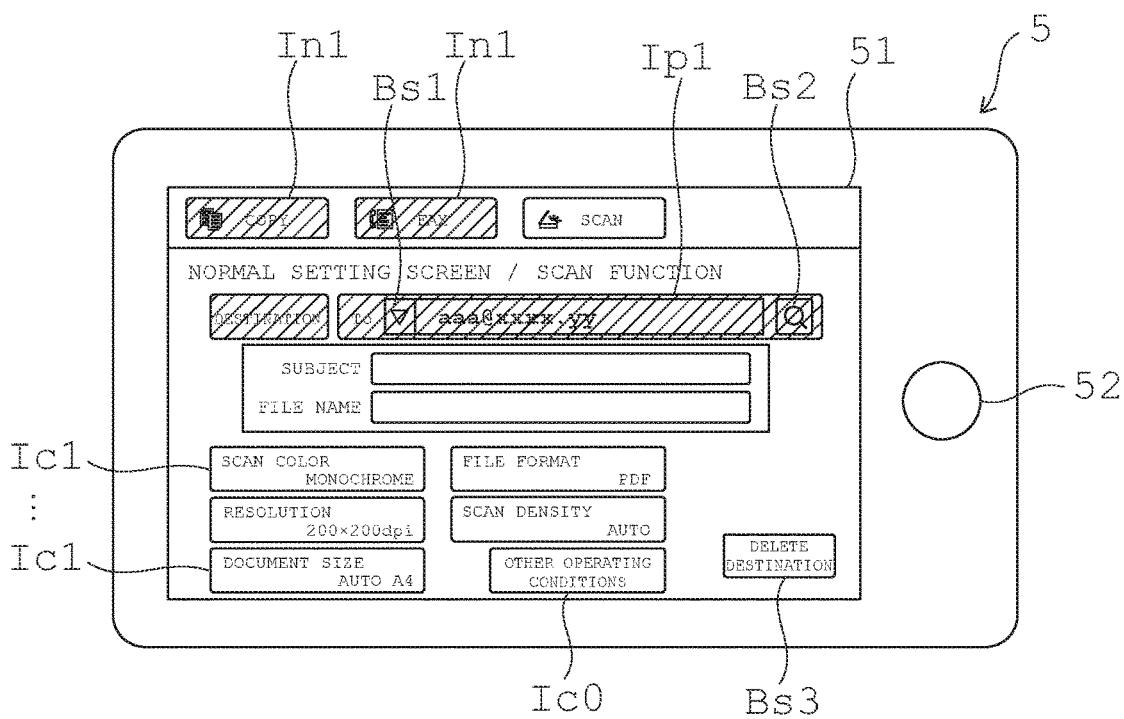

Then, the operation controller 72, together with either one of the above-mentioned destination determinations, disables operation of selecting functions (copying function and facsimile transmitting function) other than the selected scanning function (step S12 in FIG. 3). Specifically, as shown in FIG. 6B, the operation controller 72 disables operation of selecting the icons In1 that respectively permit selecting the functions other than the scanning function. FIG. 6B shows a state where the selecting operation is disabled by applying hatching to the icons In1 as objects of disabled operation. The operation controller 72 may eliminate the icons In1 as objects of disabled operation from the normal setting screen (cause them not to be displayed on the normal setting screen).

Also, the operation controller 72, together with the above-mentioned destination determination, disables additional setting operation on the destination, as shown in FIG. 6B. FIG. 6B shows a state where the setting operation is disabled by applying hatching to the setting domain Ip1 as object of disabled operation. The operation controller 72 may eliminate the setting domain Ip1 as object of disabled operation from the normal setting screen (cause it not to be displayed on the normal setting screen).

Additionally, as shown in FIG. 6B, the operation controller 72 maintains setting operation of operating conditions associated with the determined destination (such as scan color, resolution, document size, file format and scan density) as being enabled. On the other hand, the operation controller 72 disables setting operation of operating condition not associated with the determined destination (step S12 in FIG. 3). That is, the operation controller 72 maintains the selecting operation of the icons Ic1 corresponding to the respective operating conditions associated with the determined destination as being enabled. Thereby, even after the determination of destination, the user can set another operating condition on the scanning function (steps S14-S16 in FIG. 3).

If any one of the icons Ic1 operation of which is enabled on the normal setting screen is selected, the operation controller 72 causes a detailed setting screen for an operating condition corresponding to the selected icon Ic1 to be displayed on the touch display panel 51. On this detailed setting screen, the operation controller 72 permits the user to carry out operation on condition setting on the touch display panel 51, such as selection of a setting from a plurality of predetermined selection items, input of a numeral and a character, and so forth. A setting made on the detailed setting screen is indicated in the corresponding icons Ic1 on the normal setting screen. Before the operating condition is set, a setting of each operating condition agrees with a predetermined default setting and the default setting of each operating condition (see FIG. 5; such as "MONOCHROME" and "200×200 dpi") is indicated in a corresponding icon Ic1.

Further, in this embodiment, if a destination is determined on the normal setting screen, the operation controller 72 causes a button Bs3 that deletes (resets) the determined destination to be displayed on the normal setting screen (see FIG. 6B).

And if the button Bs3 is pushed (when determined to be "Yes" at step S13 in FIG. 3), the operation controller 72 deletes the determined destination (destination inputted to the entry field of the setting domain Ip1), and performs next process. The operation controller 72 enables again the setting operation on the destination that has been disabled (see step S18 in FIG. 3, and FIG. 5). Also, the operation controller 72 enables again operation of selecting functions (copying function and facsimile transmitting function) other than the scanning function that is selected. Specifically, the operation controller 72 enables again selecting operation of the icons In1 that respectively permit selecting other functions (see FIG. 5).

With the above-mentioned processing through the operation controller 72, after a destination is determined on the normal setting screen (see FIG. 6B) until the button Bs3 that deletes the destination is pushed, selecting operation of functions other than the selected scanning function is disabled. Then change of the function is to be carried out based on the user's intention of pushing the button Bs3 in order to enable again the selecting operation that have been disabled. For this reason, change of the function due to the user's misoperation (operation contrary to the user's intention) is prevented by the above-mentioned processing. Accordingly, another function is not selected while the operating conditions are set, and therefore all the settings until then are not reset. Consequently, the user does not need to carry out troublesome operation of setting the operating conditions again.

Also, with the above-mentioned processing through the operation controller 72, after a destination is determined on the normal setting screen (see FIG. 6B) until the button Bs3 for deleting the destination is pushed, further setting operation on the destination is disabled. Then change of the function is to be carried out based on the user's intention of pushing the button Bs3 in order to enable again the setting operation that has been disabled. For this reason, change and addition of the destination due to the user's misoperation (operation contrary to the user's intention) are prevented by the above-mentioned processing. Accordingly, in transmitting the image data (when determined to be "Yes" at step S17 in FIG. 3), transmission to the user' unintended destination is prevented.

[2] Second Embodiment

Figure 7A:
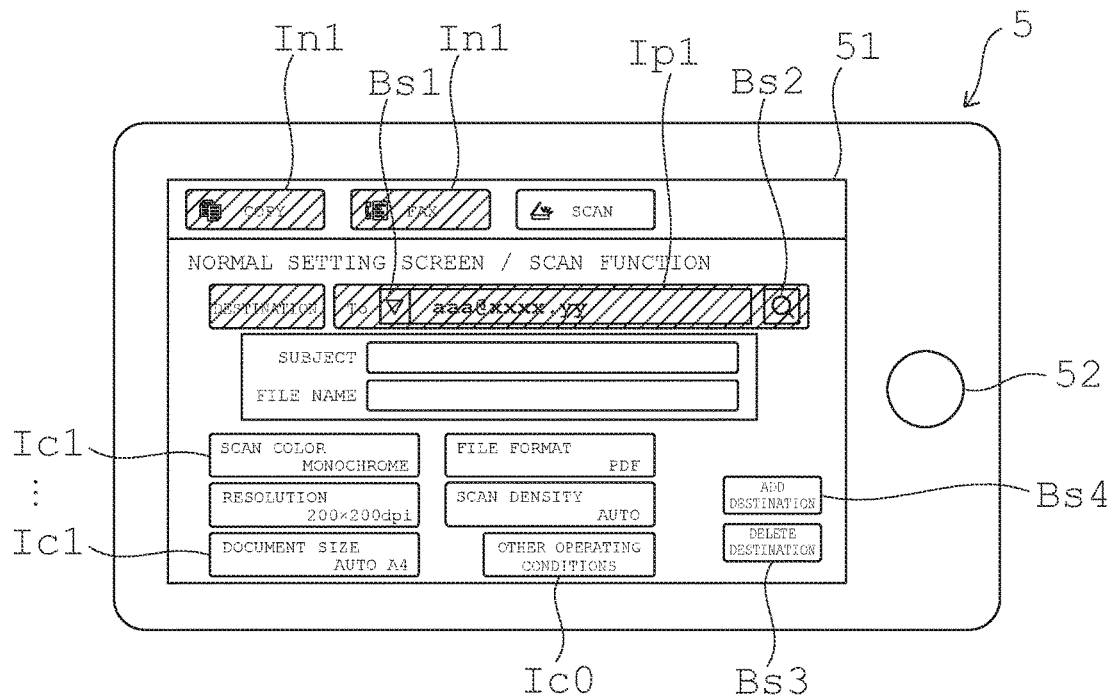
FIGS. 7A and 7B are schematic diagrams of the normal setting screen that are shown correspondingly to a process performed by the operation controller in a second embodiment, with FIG. 7A showing a state where the destination is determined, and FIG. 7B showing a state where addition of destination is enabled.

In the above-mentioned image forming apparatus, a button Bs4 that permits specifying a plurality of destinations may be displayed on the normal setting screen, as shown in FIG. 7A. This button Bs4 is one that is enabled to be pushed after the destination is determined, and that permits adding another destination other than the destination(s) that has (have) been determined. That is, the operation controller 72 permits adding the destination on the normal setting screen.

Figure 7B:
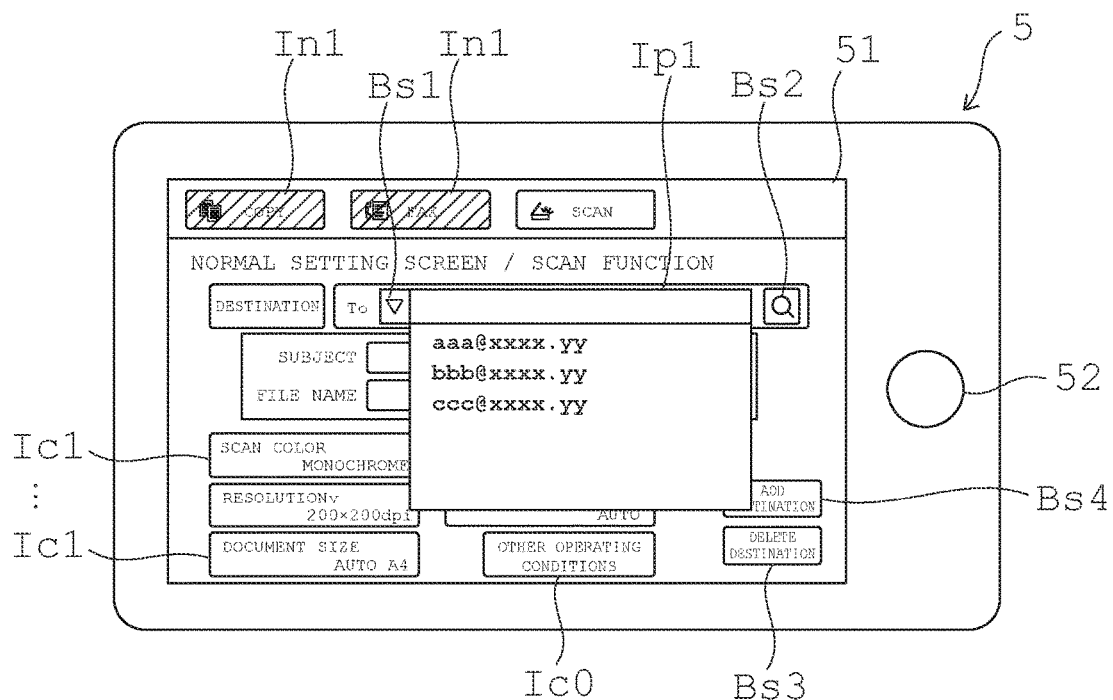

Then, if one destination is determined and thereafter the button Bs4 is pushed, the operation controller 72 enables again the setting operation on the destination that has been disabled (see FIG. 7B). And the operation controller 72 maintains operation of selecting functions (copying function and facsimile transmitting function) other than the selected scanning function as being disabled. Specifically, the operation controller 72 maintains selecting operation of the icons In1 that respectively permit selecting other functions as being disabled (see FIG. 7B).

Thereafter, if any one of the addresses displayed in list view by pushing down the button Bs1 is selected, the operation controller 72 causes the selected address to be displayed in the destination entry field that is provided in the setting domain Ip1, and determines the selected address as the destination. Also, if a destination is selected and determined on the search screen displayed by pushing down the button Bs2, the operation controller 72 causes the selected and determined destination to be displayed in the entry field. The user may directly input the address to the destination entry field through the operation of the touch display panel 51. In this case, after the input, if a determination button (not shown), for example, included in the setting domain Ip1 is pushed, the operation controller 72 determines the inputted address as the destination.

Figure 8:
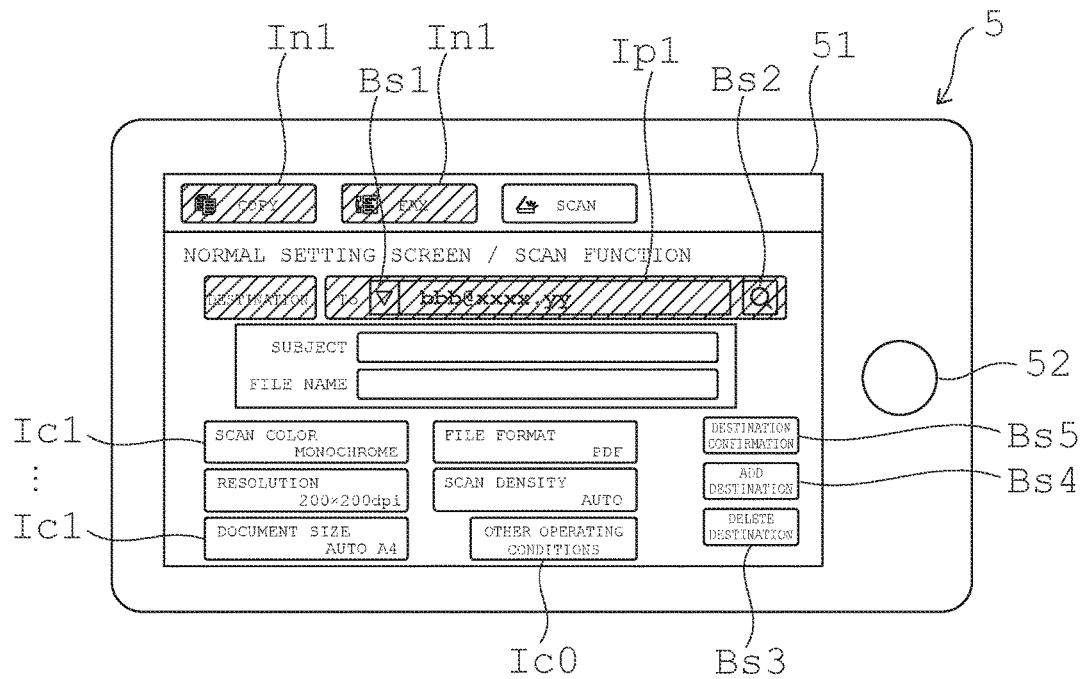
FIG. 8 is a schematic diagram of the normal setting screen that is shown correspondingly to the process performed by the operation controller in the second embodiment, the diagram showing a state where additional setting operation on the destination is disabled.

Further, the operation controller 72, together with the above-mentioned destination determination, disables again additional setting operation on the destination, as shown in FIG. 8. FIG. 8 shows a state where the setting operation is disabled by applying hatching to the setting domain Ip1 as object of disabled operation. The operation controller 72 may eliminate the setting domain Ip1 as object of disabled operation from the normal setting screen (cause it not to be displayed on the normal setting screen).

In this embodiment, the user can confirm a plurality of destinations that are determined. Specifically, the operation controller 72 causes a button Bs5 that provides a list view of the determined destinations to be displayed on the normal setting screen. Then, if the button Bs5 is pushed, the operation controller 72 causes the destinations that have been determined before to be displayed in list view.

Additionally, the button Bs3 is a button that deletes (resets) the plurality of determined destinations. And if the button Bs3 is pushed, the operation controller 72 deletes all the determined destinations and performs next process. The operation controller 72 enables again the setting operation on the destination that has been disabled (see FIG. 5). Also, the operation controller 72 enables again operation of selecting functions other than the selected scanning function. Specifically, the operation controller 72 enables again selecting operation of the icons In1 that respectively permit selecting other functions (see FIG. 5).

With the above-mentioned processing through the operation controller 72, not only is it made possible to send the image data (send the same content) to a plurality of destinations, but also specification of a plurality of addresses as destinations is to be made based on the user's intension. Therefore, transmission of the image data to the user's unintended destinations is prevented.

Here, in the second embodiment, not limited to the processing of disabling the setting operation on the destination each time one destination is determined, the operation controller 72 may perform a process such that, with number of destinations caused to be set beforehand by the user, further setting operation on the destination is disabled if the set number of destinations are specified and determined.

[3] Third Embodiment

Figure 9:
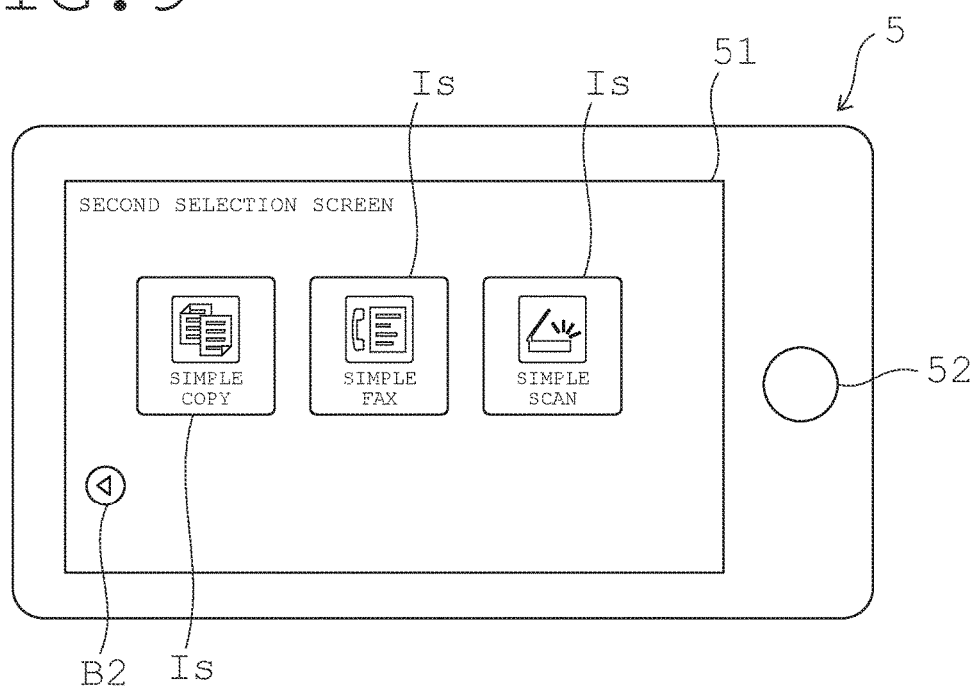
FIG. 9 is a schematic diagram showing a second selection screen that is displayed on the touch display panel.

FIGS. 10A to 10D are flow charts showing a process performed by the controller 7 including the operation controller 72 in a third embodiment. As shown in FIG. 4, the first selection screen displays, in addition to the icons In, a button B1 that changes the screen displayed on the touch display panel 51 from the first selection screen to a second selection screen. And if the button B1 is pushed on the first selection screen, the operation controller 72, as shown in FIG. 9, causes the second selection screen to be displayed on the touch display panel 51 (step S21 in FIG. 10A). This second selection screen displays a button B2 that changes the screen displayed on the touch display panel 51 from the second selection screen to the first selection screen. And if the button B2 is pushed on the second selection screen, the operation controller 72 causes the first selection screen (see FIG. 4) to be displayed on the touch display panel 51.

The second selection screen is a screen used when the user wants to carry out simple setting operation, and icons Is are disposed on the second selection screen. Each of the icons Is is used for displaying a simple setting screen for a corresponding one of the functions that the image forming apparatus possesses. On the second selection screen shown in FIG. 9, the icons Is are ones respectively corresponding to the copying function, the facsimile transmitting function (in the figure, "facsimile transmitting" is shown as "FAX" for short), and the scanning function. On the second selection screen, icons Is corresponding to various functions not limited to those above-mentioned may be displayed.

If any one of the icons Is is selected on the second selection screen, the operation controller 72, as shown in FIG. 11, causes a simple setting screen for a function corresponding to the selected icon Is to be displayed on the touch display panel 51 (steps S22 and S23 in FIG. 10A). Here, the simple setting screen is a screen that permits setting only some of the operating conditions associated with an object function. This simple setting screen displays icons Ic2 that cause each detailed setting screen for the respective operating conditions that are settable to be displayed, and a setting domain Ip2 in which an operating condition is set by inputting or the like. As an example, the icons Ic2 displayed on the simple setting screen correspond to operating conditions with high setting frequency for the user.

Figure 11A:
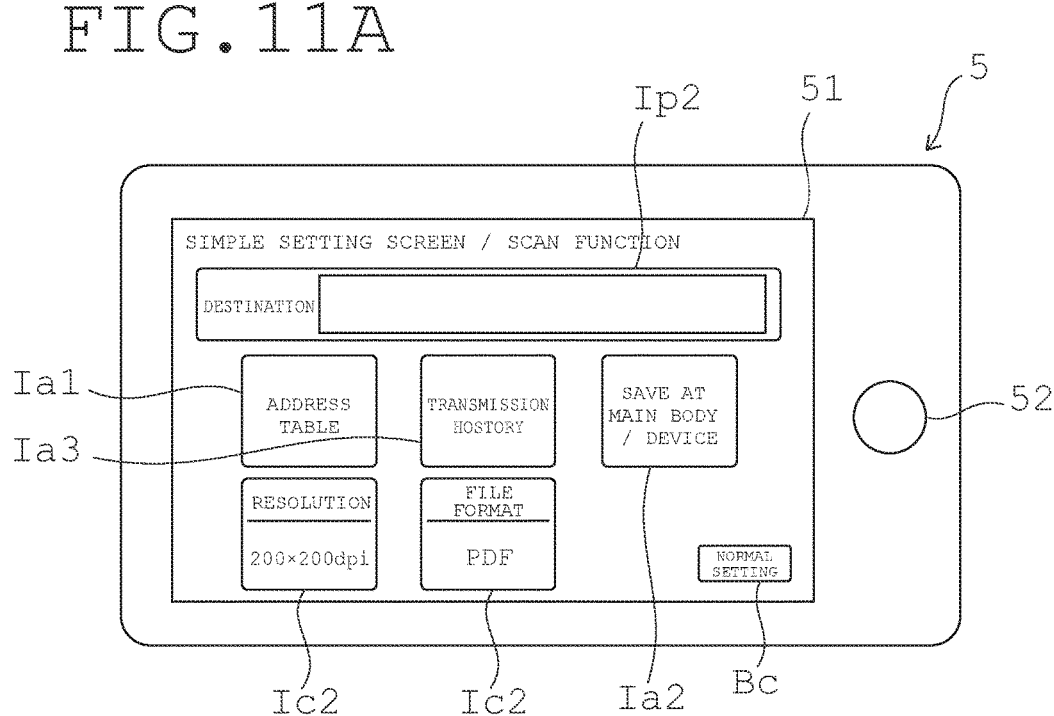
FIGS. 11A and 11B are schematic diagrams of a simple setting screen that are shown correspondingly to the process performed by the operation controller in the third embodiment, with FIG. 11A showing a state where a setting operation on a destination which is an operating condition is enabled, and FIG. 11B showing a state where additional setting operation on the destination is disabled.

FIG. 11A shows a screen displayed as a simple setting screen if the icon Is for the scanning function is selected on the second selection screen (see FIG. 9). Then, on the simple setting screen, the setting domain Ip2 is an image that permits specifying a destination (address) of the image data obtained by scanning. The icons Ic2 are ones corresponding to respective operating conditions other than the destination, and the displayed icons Ic2 correspond to two operating conditions consisting of the resolution and the file format respectively. On the simple setting screen, icons Ic2 corresponding to various functions not limited to those above-mentioned may be displayed.

Further, the simple setting screen shown in FIG. 11A includes an icon Ia1 that causes addresses that become destinations to be displayed in selectable list view, an icon Ia2 that causes the main body of the image forming apparatus (specifically, the storage portion 6), a device such as USB memory, and the like that become destinations to be displayed in selectable list view, and an icon Ia3 that causes transmission history to be displayed in list view. Here, the addresses that are displayed by selecting the icon Ia1 are, for example, those that are registered beforehand by the user.

Figure 10B:
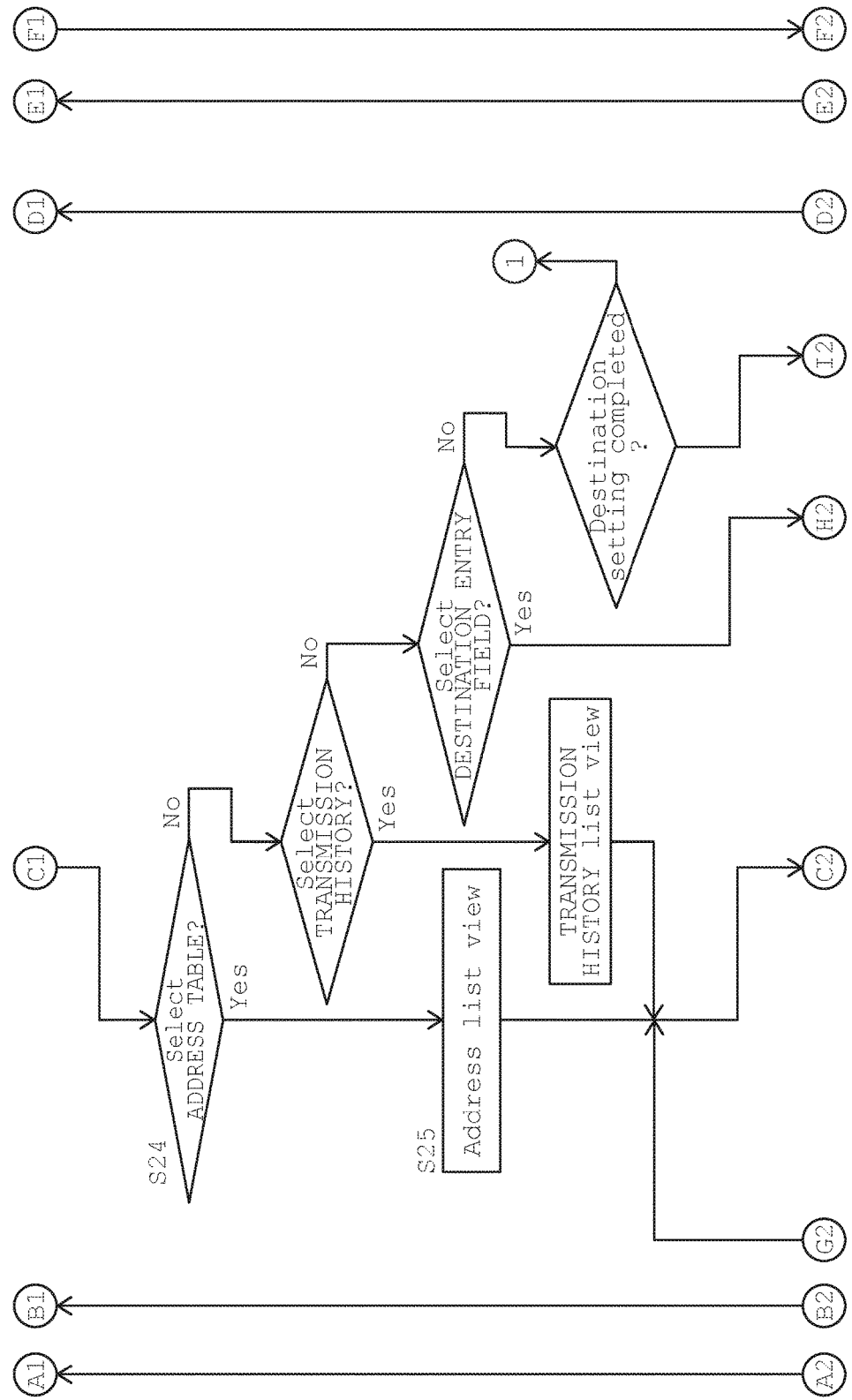
Figure 10C:
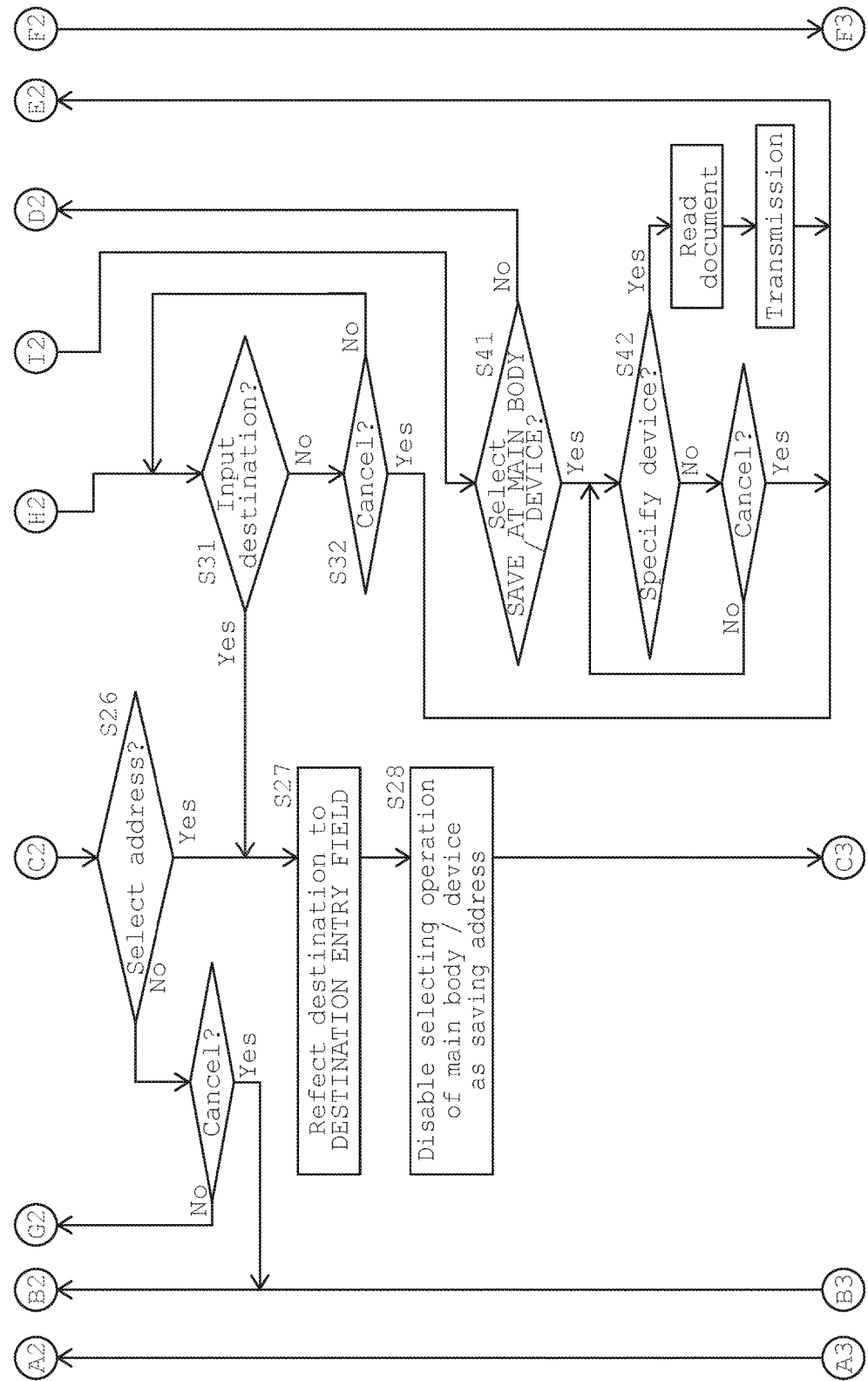

If the addresses are displayed in list view by selecting the icon Ia1 (steps S24 and S25 in FIG. 10B) and any one of the addresses displayed is selected (when determined to be "Yes" at step S26 in FIG. 10C), the operation controller 72 causes the selected address to be displayed in a destination entry field that is provided in the setting domain Ip2, and determines the selected address as the destination (step S27 in FIG. 10C). The user may directly input the address to the destination entry field through the operation of the touch display panel 51 (see steps S31 and S32 in FIG. 10C). In this case, after the input, if a determination button (not shown), for example, included in the setting domain Ip2 is pushed, the operation controller 72 determines the inputted address as the destination (step S27 in FIG. 10C).

Figure 11B:
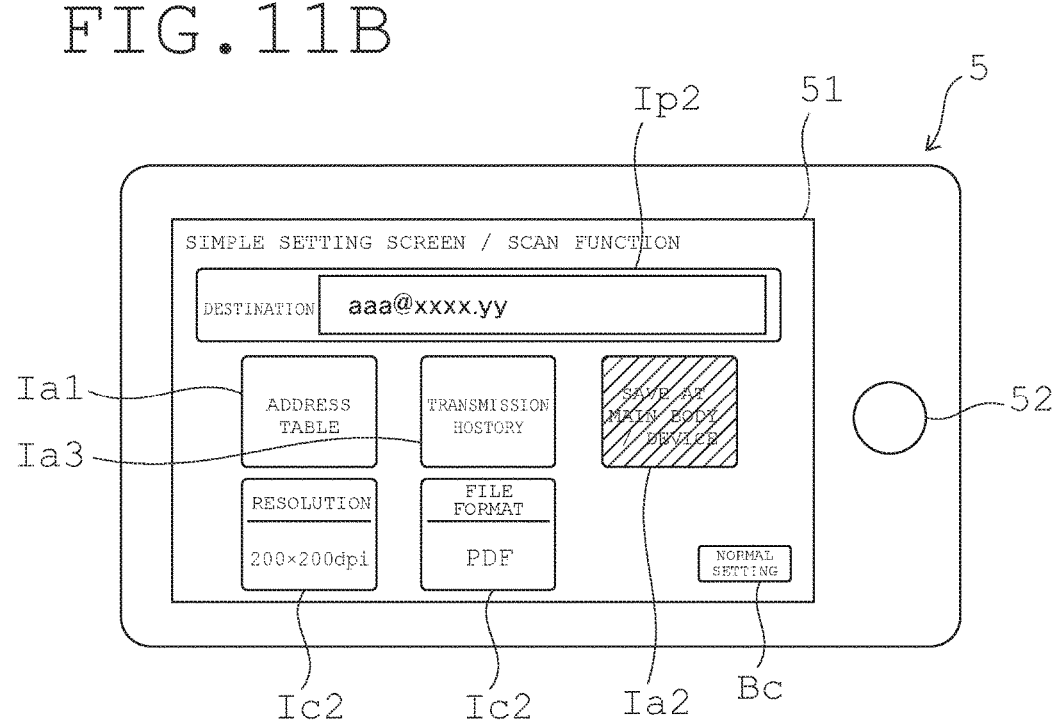

Then, the operation controller 72, together with the above-mentioned destination determination, disables operation of selecting a saving address such as the main body, a device or the like as the destination, as shown in FIG. 11B (step S28 in FIG. 10C). Specifically, the operation controller 72 disables the selecting operation of the icon Ia2. FIG. 11B shows a state where the selecting operation is disabled by applying hatching to the icon Ia2 as object of disabled operation. The operation controller 72 may eliminate the icon Ia2 as object of disabled operation from the simple setting screen (cause it not to be displayed on the simple setting screen).

In this embodiment, even after the destination is determined, addition, change and/or deletion of address can be made. That is, the operation controller 72 maintains the selecting operation of the icon Ia1 and the input operation to the entry field of the setting domain Ip2 as being enabled. Then, if the determined address (address inputted to the entry field of the setting domain Ip2) is deleted, the operation controller 72 enables again the selecting operation that has been disabled (operation of selecting the saving address such as the main body, the device or the like as destination) (see FIG. 11A).

As another operation that sets the destination, if the saving addresses such as the main body, the device and the like are displayed in list view by selecting the icon Ia2 (steps S41 in FIG. 10C) and any one of the addresses displayed is selected (when determined to be "Yes" at step S42 in FIG. 10C), the operation controller 72 causes the selected main body or the device to be displayed in the entry field, and determines the selected address as the destination.

Further, as shown in FIG. 11B, the operation controller 72 maintains setting operation of operating conditions (resolution, file format) associated with the determined destination as being enabled. On the other hand, the operation controller 72 disables setting operation of operating conditions not associated with the determined destination (not shown in FIG. 11B). That is, the operation controller 72 maintains the selecting operation of the icons Ic2 corresponding to the respective operating conditions associated with the determined destination as being enabled. Thereby, even after the determination of the destination, the user can set another operating condition on the scanning function.

If any one of the icons Ic2 operation of which is enabled on the simple setting screen is selected, the operation controller 72 causes a detailed setting screen for operating conditions corresponding to the selected icon Ic2 to be displayed on the touch display panel 51. On this detailed setting screen, the operation controller 72 permits the user to carry out operation on condition setting on the touch display panel 51, such as selection of a setting from a plurality of predetermined selection items, input of a numeral and a character, and so forth. A setting made on the detailed setting screen is indicated in the corresponding icons Ic2 on the simple setting screen. Before the operating condition is set, a setting of each operating condition agrees with a predetermined default setting and the default setting of each operating condition (see FIG. 11; "200×200 dpi" and "PDF") is indicated in a corresponding icon Ic2.

Additionally, in this embodiment, with respect to the object function (scanning function in FIG. 11), a button Bc that changes the display screen to the normal setting screen is displayed on the simple setting screen. And if the button Bc is selected on the simple setting screen, the operation controller 72 changes the display screen on the touch display panel 51 to the normal setting screen (see FIG. 5). Even in the setting operation on the simple setting screen, when it becomes necessary to set some operating condition(s) unable to be set on the simple setting screen, the user can move to the normal setting screen without troublesome operation.

With the above-mentioned processing through the operation controller 72, after an address is determined as the destination on the simple setting screen (see FIG. 11) until the address is deleted, the operation of selecting the saving address such as the main body, the device or the like as destination is disabled. Then change of the destination to the main body, the device or the like is to be carried out based on the user's intention of deleting the address in order to enable again the selecting operation that has been disabled. For this reason, change and addition of the destination due to the user's misoperation (operation contrary to the user's intention) are prevented by the above-mentioned processing.

Accordingly, in transmitting the image data (steps S51 and S52 in FIG. 10D), transmission to destination(s) unintended by the user is prevented.

Additionally, the technology of transmitting the same content in the second embodiment can also be applied to the simple setting screen in this third embodiment.

[4] Other Embodiments

[4-1] Fourth Embodiment

The above-mentioned technologies in the first to the third embodiments can be applied to processes that are performed in selecting other functions not limited to the scanning function such as the copying function, the facsimile transmitting function and so forth. In the following, a case where the technology in the first embodiment is applied to processes that are performed when the copying function is selected is explained specifically.

Figure 12A:
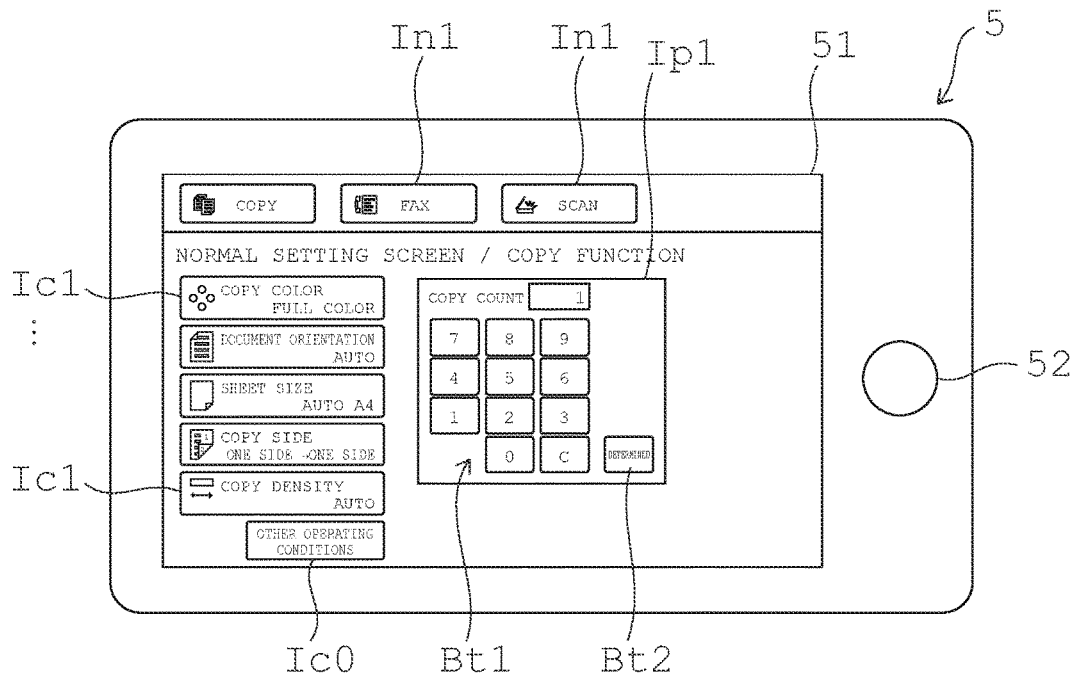
FIGS. 12A and 12B are schematic diagrams of the normal setting screen that are shown correspondingly to a process performed by the operation controller in a fourth embodiment, with FIG. 12A showing a state where a setting operation on a copy count which is an operating condition is enabled, and FIG. 6B showing a state where additional setting operation on the copy count is disabled.

If the icon In for the copying function is selected on the first selection screen (see FIG. 4), as shown in FIG. 12A, a normal setting screen for the copying function is displayed. Then, on the normal setting screen, the setting domain Ip1 is an image that permits setting a copy count (numeral input). The icons Ic1 are ones corresponding to respective operating conditions other than the copy count, and the displayed icons Ic1 correspond to a copy color, a document orientation, a sheet size, a copy side, and a copying density respectively. Icons Ic1 respectively corresponding to operating conditions other than those above-mentioned are integrated into one icon Ico written as "OTHER OPERATING CONDITIONS".

Additionally, the normal setting screen displays icons In1 that permit selecting functions (facsimile transmitting function and scanning function) other than the copying function that is selected.

The setting domain Ip1 includes a numeric keypad Bt1, and a button Bt2 that determines a numeral (a copy count) inputted to an entry field. And if a numeral is inputted to the entry field through the operation of the numeric keypad Bt1 and the button Bt2 is pushed, the operation controller 72 determines the inputted numeral as the copy count. The user may directly input the numeral to the copy count entry field through the operation of the touch display panel 51.

Figure 12B:
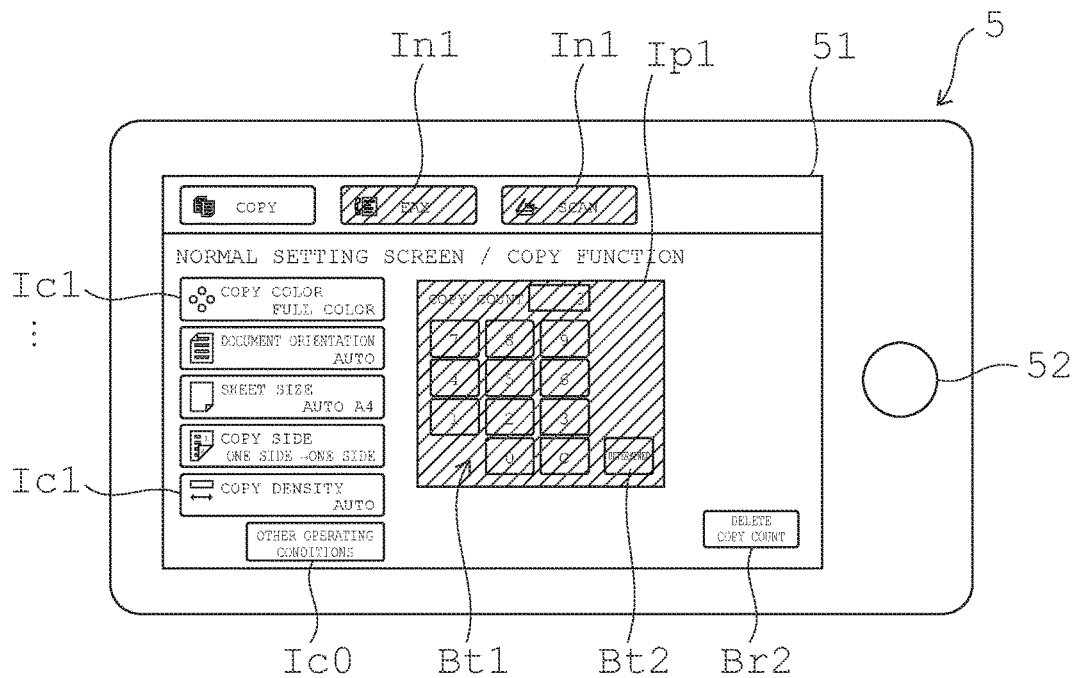

Then, the operation controller 72, together with the above-mentioned copy count determination, disables operation of selecting functions (facsimile transmitting function and scanning function) other than the copying function that is selected. Specifically, as shown in FIG. 12B, the operation controller 72 disables operation of selecting the icons In1 that respectively permit selecting functions other than the copying function. FIG. 12B shows a state where the selecting operation is disabled by applying hatching to the icons In1 as objects of disabled operation. The operation controller 72 may eliminate the icons In1 as objects of disabled operation from the normal setting screen (cause them not to be displayed on the normal setting screen).

Also, the operation controller 72, together with the above-mentioned copy count determination, disables additional setting operation on the copy count, as shown in FIG. 12B. FIG. 12B shows a state where the setting operation is disabled by applying hatching to the setting domain Ip1 as object of disabled operation. The operation controller 72 may eliminate the setting domain Ip1 as object of disabled operation from the normal setting screen (cause it not to be displayed on the normal setting screen).

Additionally, as shown in FIG. 12B, the operation controller 72 maintains setting operation of operating conditions associated with the determined copy count (such as copy color, document orientation, sheet size, copy side, and copying density) as being enabled. On the other hand, the operation controller 72 disables setting operation of operating conditions not associated with the determined copy count (not shown in FIG. 12B). That is, the operation controller 72 maintains the selecting operation of the icons Ic1 corresponding to the respective operating conditions associated with the determined copy count as being enabled. Thereby, even after the determination of the copy count, the user can set another operating condition on the copying function.

Further, in this embodiment, if the copy count is determined on the normal setting screen, the operation controller 72 causes a button Br2 that deletes (resets) the determined copy count to be displayed on the normal setting screen (see FIG. 12B).

And if the button Br2 is pushed, the operation controller 72 deletes the determined copy count (numeral inputted to the entry field of the setting domain Ip1), and performs next process. The operation controller 72 enables again the setting operation on the copy count that has been disabled (see FIG. 12A). Also, the operation controller 72 enables again operation of selecting functions (facsimile transmitting function and scanning function) other than the copying function that is selected. Specifically, the operation controller 72 enables again selecting operation of the icons In1 that respectively permit selecting other functions (see FIG. 12A).

With the above-mentioned processing through the operation controller 72, after the copy count is determined on the normal setting screen (see FIG. 12B) until the button Br2 for deleting the copy count is pushed, operation of selecting functions other than the selected copying function is disabled. Then change of the function is to be carried out based on the user's intention of pushing the button Br2 in order to enable again the selecting operation that have been disabled. For this reason, change of the function due to the user's misoperation (operation contrary to the user's intention) is prevented by the above-mentioned processing. Accordingly, another function is not selected while the operating conditions are set, and therefore all the settings until then are not reset. Consequently, the user does not need to carry out troublesome operation of setting the operating conditions again.

Also, with the above-mentioned processing through the operation controller 72, after the copy count is determined on the normal setting screen (see FIG. 12B) until the button Br2 that deletes the copy count is pushed, further setting operation on the copy count is disabled. Then change of the copy count is to be carried out based on the user's intention of pushing the button Br2 in order to enable again the setting operation that have been disabled. For this reason, change of the copy count due to the user's misoperation (operation contrary to the user's intention) is prevented by the above-mentioned processing. Accordingly, copying of the copy count not intended by the user is prevented from being performed.

[4-2] Fifth Embodiment

The above-mentioned processes performed by the operation controller 72 may be realized by causing the image forming apparatus to perform control programs. Then, such control programs may be stored in a storage medium (such as hard disk, memory card or the like) in computer readable state.

The above explanations of the embodiments including the processes shown by the flow charts are nothing more than illustrative in any respect, nor should be thought of as restrictive. Scope of the present invention is indicated by claims rather than the above embodiments. Further, it is intended that all changes that are equivalent to a claim in the sense and realm of the doctrine of equivalence be included within the scope of the present invention.

What is claimed is:

1. An image forming apparatus having a plurality of operating functions and permitting setting an operating condition for each of the operating functions, the image forming apparatus comprising:
   a user interface used to select each of the operating functions and set the operating condition;
   an image processor that performs an image processing in a manner that depends on an operating function selected and an operating condition set at the user interface; and
   a controller that controls the user interface and the image processor, wherein
   if a first one of the operating functions is selected at the user interface and a setting is determined on a predetermined operating condition that is settable within the selected first operating function, the controller controls the user interface such that other operating functions of the plurality of operating functions other than the selected first operating function are still displayed with the first operating function but are not selectable;
   if the first operating function is selected at the user interface, the controller controls the user interface such that the other operating functions are selectable before the predetermined operating condition corresponding to the first operating function is set; and
   if the predetermined operating condition corresponding to the first operating function is settable and a second one of the other operating functions is selected, the controller controls the user interface such that a state in which the predetermined operating condition corresponding to the first operating function is settable is switched to a state in which operating conditions corresponding to the second one of the other operating functions are settable.

2. The image forming apparatus according to claim 1, wherein
   if the first one of the operating functions is selected at the user interface and the setting is determined on the predetermined operating condition that is settable within the selected first operating function, the controller further disables additional setting operation on the predetermined operating conditions.

3. The image forming apparatus according to claim 2, wherein
   the controller further performs:
   (i) a process that permits resetting the determined setting on the predetermined operating condition at the user interface; and
   (ii) a process that enables again the disabled setting operation of the predetermined operating condition if the determined setting is reset at the user interface.

4. The image forming apparatus according to claim 3, wherein
   if the determined setting is reset at the user interface, the controller, in addition to the process (ii), performs a process that enables again operation of selecting an operating function other than the selected first operating function.

5. The image forming apparatus according to claim 2, wherein
   the controller further performs:
   (iii) a process that permits addition of a setting on the predetermined operating condition at the user interface; and
   (iv) a process that disables additional setting operation on the predetermined operating condition, if the setting is added and determined on the predetermined operating condition.

6. The image forming apparatus according to claim 3, wherein
   the controller further performs:
   (iii) a process that permits addition of a setting on the predetermined operating condition at the user interface; and
   (iv) a process that disables additional setting operation on the predetermined operating condition, if the setting is added and determined on the predetermined operating condition.

7. The image forming apparatus according to claim 4, wherein
   the controller further performs:
   (iii) a process that permits addition of a setting on the predetermined operating condition at the user interface; and
   (iv) a process that disables additional setting operation on the predetermined operating condition, if the settings is added and determined on the predetermined operating condition.

8. The image forming apparatus according to claim 2, wherein
   if the setting is determined on the predetermined operating condition, the controller disables setting operation of other operating condition except at least one operating condition associated with the determined setting.

* * * * *